United States Patent
Galpin et al.

(10) Patent No.: US 11,128,864 B2
(45) Date of Patent: Sep. 21, 2021

(54) DEEP LEARNING BASED IMAGED PARTITIONING FOR VIDEO COMPRESSION

(71) Applicant: InterDigital VC Holdings, Inc., Wilmington, DE (US)

(72) Inventors: Franck Galpin, Cesson-Sevigne (FR); Fabien Racape, Los Altos, CA (US); Philippe Bordes, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/046,259

(22) PCT Filed: Apr. 9, 2019

(86) PCT No.: PCT/US2019/026438
§ 371 (c)(1),
(2) Date: Oct. 8, 2020

(87) PCT Pub. No.: WO2019/199716
PCT Pub. Date: Oct. 17, 2019

(65) Prior Publication Data
US 2021/0136371 A1  May 6, 2021

(30) Foreign Application Priority Data
Apr. 10, 2018 (EP) .................... 18305422

(51) Int. Cl.
*H04N 19/119* (2014.01)
*H04N 19/105* (2014.01)
(Continued)

(52) U.S. Cl.
CPC ......... *H04N 19/119* (2014.11); *G06N 3/0454* (2013.01); *H04N 19/105* (2014.11);
(Continued)

(58) Field of Classification Search
None
See application file for complete search history.

(56) References Cited

U.S. PATENT DOCUMENTS

| 2019/0042867 A1* | 2/2019 | Chen .................. G06K 9/46 |
| 2019/0147105 A1* | 5/2019 | Chu ................. G06F 16/7834 |
| | | 386/241 |

OTHER PUBLICATIONS

Xiaolin Shen et. al: "Fast coding unit size selection for HEVC based on Bayesian decision rule", 2012 Picture Coding Symposium (PCS 2012): Krakow, Poland, May 7-9, 2012; [Proceedings], IEEE, Picataway, NJ, May 7, 2012 (May 7, 2012), pp. 452-456 (Year: 2012).*

(Continued)

*Primary Examiner* — Lindsay J Uhl
(74) *Attorney, Agent, or Firm* — Condo Roccia Koptiw LLP

(57) ABSTRACT

A block of video data is split using one or more of several possible partition operations by using the partitioning choices obtained through use of a deep learning-based image partitioning. In at least one embodiment, the block is split in one or more splitting operations using a convolutional neural network. In another embodiment, inputs to the convolutional neural network come from motion vector fields and corresponding residuals. Methods, apparatus, and signal embodiments are provided for encoding.

25 Claims, 15 Drawing Sheets

(51) Int. Cl.
  *H04N 19/159* (2014.01)
  *H04N 19/176* (2014.01)
  *H04N 19/52* (2014.01)
  *G06N 3/04* (2006.01)

(52) U.S. Cl.
  CPC ......... *H04N 19/159* (2014.11); *H04N 19/176* (2014.11); *H04N 19/52* (2014.11)

(56) References Cited

OTHER PUBLICATIONS

Galpin, F. et al: "AHG9: CNN-based driving of block partitioning for intra slices encoding", JVET meeting; Apr. 10, 2018-Apr. 20, 2018; San Diego' (The Joint Video Exploration Team of ISO/IEC JTC1/SC29/WG11 and ITU-T SG.16); Doc. No. JVET-J0034, Apr. 3, 2018 (Apr. 3, 2018) (Year: 2018).*

Kim et al., "A Feature-Based Approach to Fast H.264 Infra/Inter Mode Decision", 2005 IEEE International Symposium on Circuits and Systems, Kobe, Japan, May 23, 2005, pp. 308-311.

Liu et al., "Video Frame Synthesis using Deep Voxel Flow", 2017 IEEE International Conference on Computer Vision, Venice, Italy, Oct. 22, 2017, 9 pages.

Liu et al., "CU Partition Mode Decision for HEVC Hardwired Intra Encoder Using Convolution Neural Network", IEEE Transactions on Image Processing, vol. 25, No. 11, Nov. 2016, pp. 5088-5103.

Huang et al., "EE2/1: Quadtree Plus Binary Tree Structure Integration with JEM Tools", Joint Video Exploration Team (JVET) of ITU-T SG 16 WP 3 and ISO/IEC JTC 1/SC 29/WG 11, Document: JVET-C0024, 3rd Meeting, Geneva Switzerland, May 26, 2016, 5 pages.

Shen et al., "Fast Coding Unit Size Selection for HEVC based on Bayesian Decision Rule", 2012 Picture Coding Symposium, Krakow, Poland, May 7, 2012, pp. 453-456.

Galpin et al., "AHG9: CNN-based Driving of Block Partitioning for Intra Slices Encoding", Joint Video Experts Team (JVET) of ITU-T SG 16 WP 3 and ISO/IEC JTC 1/SC 29/WG 11, Document: JVET-J0034, 10th Meeting, San Diego, California, USA, Apr. 10, 2018, 12 pages.

Jin et al., "CNN Oriented Fast QTBT Partition Algorithm for JVET Infra Coding", 2017 IEEE Visual Communications and Image Processing (VCIP), St. Petersburg, Florida, USA, Dec. 10, 2017, 4 pages.

Anonymous, "Reference software for ITU-T H.265 high efficiency video coding", International Telecommunication Union, ITU-T Telecommunication Standardization Sector of ITU, Series H: Audio-visual and Multimedia Systems, infrastructure of audiovisual services—Coding of moving video, Recommendation ITU-T H.265.2, Oct. 2014, pp. 1-12.

Li et al., "Report of AHG3 on JEM Software Development", Joint Video Exploration Team (JVET) of ITU-T SG 16 WP 3 and ISO/IEC JTC 1/SC 29/WG 11, Document: JVET-I0003, 9th Meeting, Gwangju, Korea, Jan. 20, 2018, 3 pages.

* cited by examiner

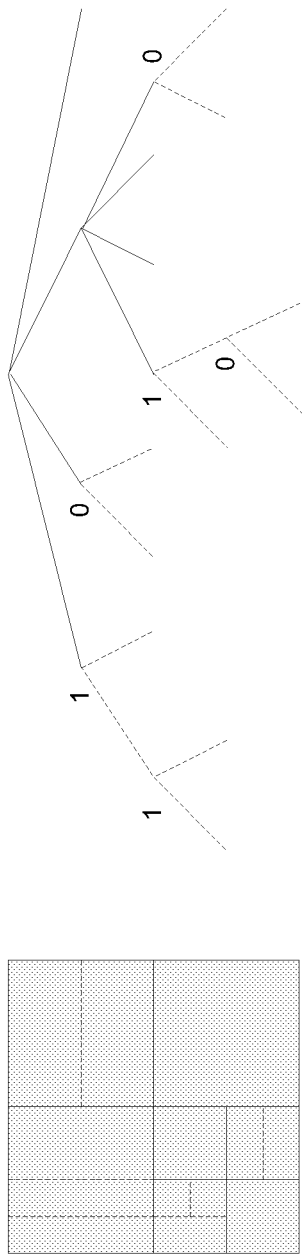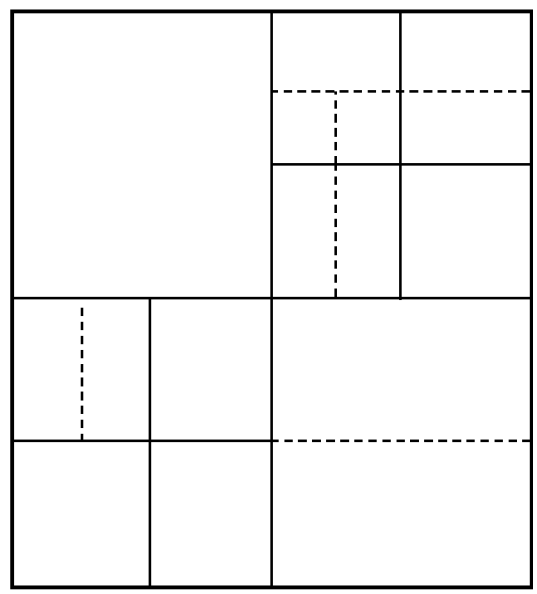
Figure 4
Figure 5

DEEP LEARNING BASED IMAGED PARTITIONING FOR VIDEO COMPRESSION

This application claims the benefit, under 35 U.S.C. § 365 of International Application PCT/US2019/026438, filed Apr. 9, 2019, which was published in accordance with PCT Article 21(2) on Oct. 17, 2019, in English, and which claims the benefit of European Patent Application No. EP 18305422.0, filed Apr. 10, 2018.

FIELD OF THE INVENTION

The present principles relate to the field of video compression.

BACKGROUND OF THE INVENTION

In the HEVC video compression standard (International Telecommunication Union, ITU-T H.265 High Efficiency Video Coding), a picture is divided into so-called Coding Tree Units (CTU), whose size is typically 64×64, 128×128, or 256×256 pixels.

Each CTU is represented by a Coding Tree in the compressed domain. This is a quad-tree division of the CTU, where each leaf is called a Coding Unit (CU), as shown in FIG. 1.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

The Partitioning of a Coding Unit into Prediction Unit(s) is done according to the partition type, signaled in the bit-stream. For Intra coding unit, only the partition types 2N×2N and N×N, illustrated in FIG. 3, are used. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

X. Shen et al. describes in "*Fast coding unit size selection for HEVC based on Bayesian decision rule*" (in Picture Coding Symposium; IEEE Proceedings, 7 May 2012) a Bayesian decision rule to assist decision on the splitting of a coding unit on the encoder side through a rate distortion optimization. However, the modeling of X. Shen et al. which takes at input a set of scalar values determined per coding unit (for instance a motion vector per CU), and which outputs a probability decision on whether a CU is split into 4 sub-CUs, fails to address more complex partitioning issues involved by the latest video compression tools.

New emerging video compression tools include a Coding Tree Unit representation in the compressed domain allowing to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4.

The QTBT representation on a block is illustrated in FIG. 5.

The splitting of a coding unit is decided on the encoder side through a rate distortion optimization procedure which consists in determining the QTBT representation of the CTU with minimal rate distortion cost.

In the QTBT technology, a CU has either square or rectangular shape. The size of coding unit is always a power of 2, and typically goes from 4 to 256.

In addition to this variety of rectangular shapes for a coding unit, this new CTU representation has the following different characteristics compared to HEVC.

First, the QTBT decomposition of a CTU is made of two stages: first the CTU is split in a quad-tree fashion, then each quad-tree leaf can be further divide in a binary fashion. This is illustrated on the right of FIG. 4 where solid lines represent the quad-tree decomposition phase and dashed lines represent the binary decomposition that is spatially embedded in the quad-tree leaves.

Second, in intra slices, the Luma and Chroma block partitioning structure is separated, and decided independently.

Next, no more CU partitioning into predictions units or transform units is employed. In other words, each Coding Unit is systematically made of a single prediction unit (previously 2N×2N prediction unit partition type) and single transform unit (no division into a transform tree).

However, further improved compression efficiency is needed for QTBT technology.

SUMMARY OF THE INVENTION

These and other drawbacks and disadvantages of the prior art are addressed by at least one of the described embodiments, which are directed to a method and apparatus for coding a block of video data. In at least one embodiment, it is proposed to use a convolutional neural network to generate a vector of boundaries partition probabilities for deciding the splitting of a coded block.

According to at least one general embodiment described herein, there is provided a method for coding a block of video data. The method comprises generating a vector of boundaries possibilities for a block of image data using a convolutional neural network from at least one input data, an input data comprising for the block of image data a motion vector field and residual data from motion compensation based on said motion vector field; partitioning said block of image data into one or more smaller blocks using said vector of boundaries possibilities; and, encoding said one or more smaller blocks. Advantageously, a motion vector field comprises a motion vector for each elementary sub-block of the block of image data and residual data is thus determined per each elementary sub-block of the block of image data.

According to another general embodiment described herein, there is provided an apparatus for coding a block of video data. The apparatus comprises a memory, and a processor, configured to generate a vector of boundaries possibilities for a block of image data using a convolutional neural network from at least one input data, an input data comprising, for said block of image data, a motion vector field and residual data from motion compensation based on the motion vector field; partition said block of image data into one or more partitions using said vector of boundaries possibilities; and, encode said one or more partitions.

According to another aspect described herein, there is provided a nontransitory computer readable storage medium containing data content generated according to the method of any one of the described method embodiments, or by the apparatus of any one of the described apparatus embodiments for playback using a processor.

According to another aspect described herein, there is provided a signal comprising video data generated according to the method of any one of the described method embodiments for coding a block of video data, or by the apparatus of any one of the described apparatus embodiments for coding a block of video data, for playback using a processor.

According to another aspect described herein, there is provided a computer program product comprising instructions which, when the program is executed by a computer, cause the computer to carry out the method of any one of the described method embodiments.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 4 illustrates an example quad-tree plus binary-tree coding tree unit representation.

FIG. 5 illustrates one embodiment of a the Quad Tree plus Binary Tree representation on a coding block.

DETAILED DESCRIPTION

For clarity, in this description, "dividing", "segmenting" and "splitting" all mean the same thing, which is the act of performing a straight-line division of a block of pixels. Similarly, "splits", and "divisions" mean the same thing, a grouping of pixels as a result of dividing, splitting or segmenting a block or a sub-block.

In the HEVC video compression standard, a picture is divided into so-called Coding Tree Units (CTU), with typical sizes of 64×64, 128×128, or 256×256 pixels.

Figure 1:
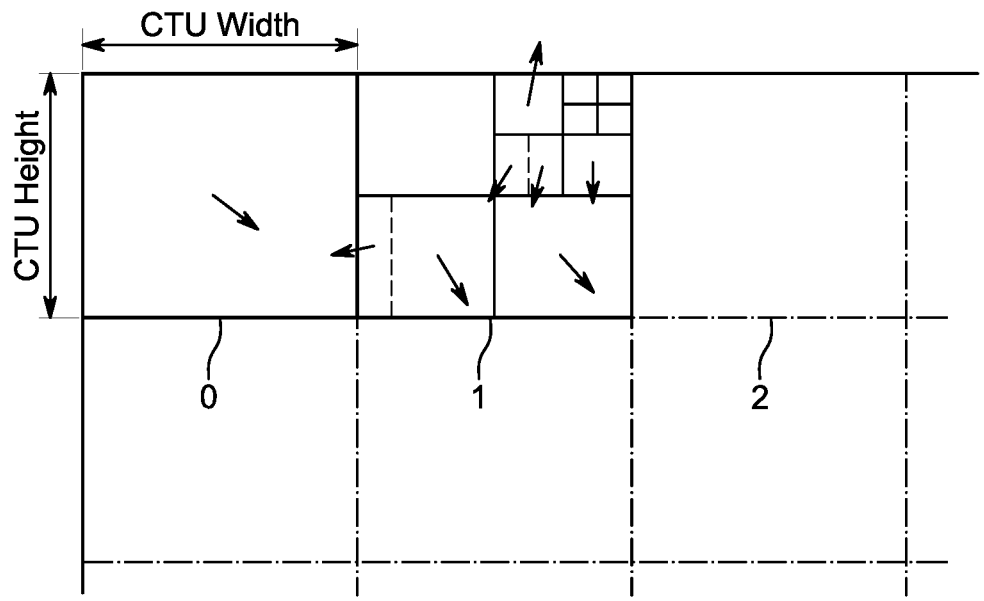
FIG. 1 illustrates one example of a coding tree unit and coding tree concepts to represent a compressed picture.

Each CTU is represented by a Coding Tree in the compressed domain. This is a quad-tree division of the CTU, where each leaf is called a Coding Unit (CU), see FIG. 1.

Figure 2:
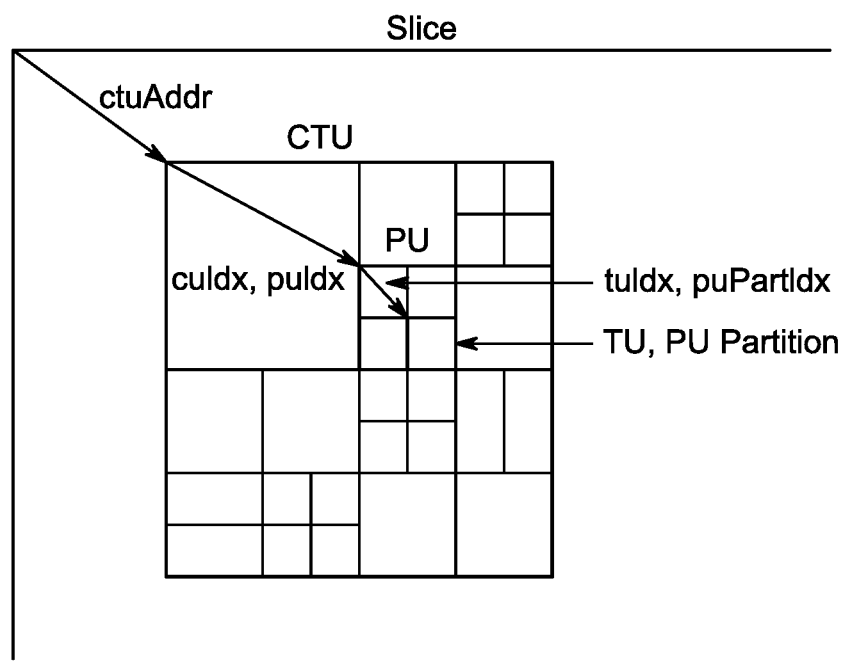
FIG. 2 illustrates an example of the division of a coding tree unit into coding units, prediction units and transform units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Figure 3:
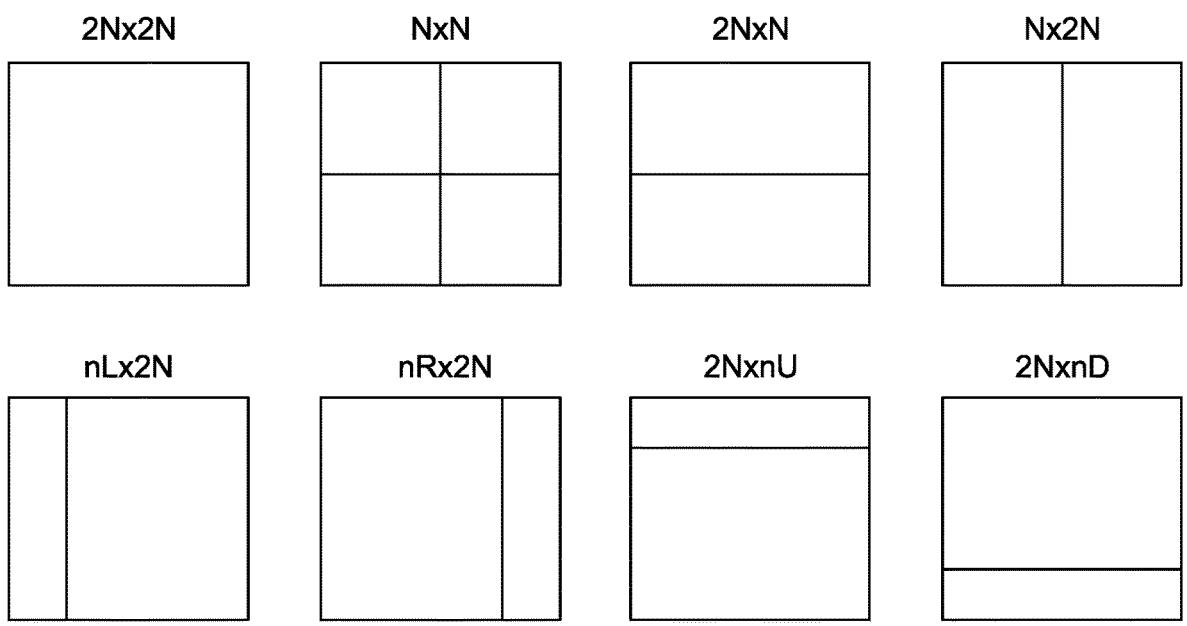
FIG. 3 illustrates an example of partitioning of coding units.

The Partitioning of a Coding Unit into Prediction Unit(s) is done according to the partition type, signaled in the bit-stream. For Intra coding unit, only the partition types 2N×2N and N×N, illustrated in FIG. 3 are used in HEVC. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain in order to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree (4 sub-units) and in a binary-tree (2 sub-units) fashion. Such coding tree representation of a Coding Tree Unit is illustrated in FIG. 4.

The splitting of a coding unit is decided on the encoder side through a rate distortion optimization procedure, which consists in determining the QTBT representation of the CTU with minimal rate distortion cost.

In the QTBT technology, a CU has either square or rectangular shape. The size of coding unit is usually a power of 2, and typically goes from 4 to 256.

In addition to this variety of rectangular shapes for a coding unit, this new CTU representation has the following different characteristics compared to HEVC.

First, the QTBT decomposition of a CTU is made of two stages: first the CTU is split in a quad-tree fashion, then each quad-tree leaf can be further divided in a binary fashion. This is illustrated on the right of FIG. 4 where solid lines represent the quad-tree decomposition phase and dashed lines represent the binary decomposition that is spatially embedded in the quad-tree leaves.

Next, in intra slices, the luma and chroma block partitioning structure is separated, and decided independently.

Further, no more CU partitioning into predictions units or transform units is employed. In other words, each Coding Unit is systematically made of a single prediction unit (previously 2N×2N prediction unit partition type) and single transform unit (no division into a transform tree).

The described embodiments concern the domain of picture coding unit representation in compression and aims at further improved compression efficiency.

The problem addressed by at least one of the described embodiments is how to improve and/or accelerate the Rate Distortion Optimization (RDO) that is performed at an encoder, which corresponds to the decisions made by the encoder to select the best tools of a standard to compress a given block, macroblock or Coding Tree Unit (CTU). Instead of checking the bitrate/distortion at each block level to find the optimal partitions for inter slices, a CNN (Convolutional Neural Network) network provides a probability score of each type of possible split into smaller blocks. The computation of this score is very fast since it can be highly parallelizable and can be less complex than a classical RDO operation by pruning the tree of possible CTU partitions to explore.

These embodiments are incorporated within the framework of compression of video, specifically at the encoding stage where decisions are made to partition the images of a given input video sequence into blocks. Since H.264/MPEG4-AVC, hybrid codecs have partitioned the images into blocks of different sizes to adapt their compression tools to the textures and objects. In H.265/HEVC for example, the images are first divided into 64×64 non-overlapping Coding Tree Units (CTU), which are then potentially split into smaller Coding Units (CU) down to 8×8 pixels. Although the standards only specify the syntax that signals the sizes of these CU, encoders require an efficient way to choose and optimize the sizes over the images, depending on its ability to compress the different regions. This process is included into the so-called Rate-Distortion Optimization (RDO) that aims at finding the best compromise between a target quality of a reconstructed region and the required bits to be transmitted. Basically, if a CTU contains a signal which is well predicted and reconstructed, there is no need to split it into small blocks, which would result in more syntax. However, when a highly detailed texture is difficult to encode and results in residuals with a high energy, it is relevant to split into small blocks since the price of the syntax is worthwhile compared to the cost reduction of residuals. A full RDO would then consist in evaluating every possible block partitioning of a CTU, which is of huge complexity. A reference software encoder uses a subset of the full RDO, considers only a fixed causal part in the CTU and adds some heuristics but the combinatory remains very high.

Classical encoders start from the evaluation of bigger blocks and take at each level the decision to split into smaller blocks. In the proposed embodiments described herein, deep-learning is used to predict when to split a given block into smaller blocks and how to do so.

To perform RDO with an acceptable complexity, several methods have been implemented in existing codecs.

First, split the search into 2 passes: a first pass performs almost all the prediction modes and splitting options but evaluates the energy of the potential residual with a fast method. Then, the partitioning is fixed, and the second pass precisely evaluates the cost of a subset of best selected modes, transforms or other tools.

In addition, heuristics can be used to avoid less probable partitions, for example by considering the partitioning of previously coded neighboring regions.

The proposed method herein enables much faster selections of partitions while keeping an excellent and driven accuracy.

A prior fast-encoding method involving CNN-based methods for RDO speedup has already been disclosed by the same applicant in the European patent Application 17306773.7 filed on Jan. 26, 2018 for partitioning of intra slices. In this method, a convolutional network is used to make decisions on whether to split a given block responsive to pixels of the given block and to causal pixels adjacent to the given block. However, a method involving CNN-based method for partitioning of inter slices is still desirable.

The basic idea of the proposed embodiments is use a CNN to improve the Rate Distortion Optimization at the encoder side of existing and future codecs. Specifically, this technique allows a system to compute better decisions of partitioning the images in terms of accuracy and speed.

The described embodiments offer methods that consider the properties of the initial blocks, such as CTUs in HEVC for instance, and provide probabilities of splitting them into smaller shapes.

Figure 6:
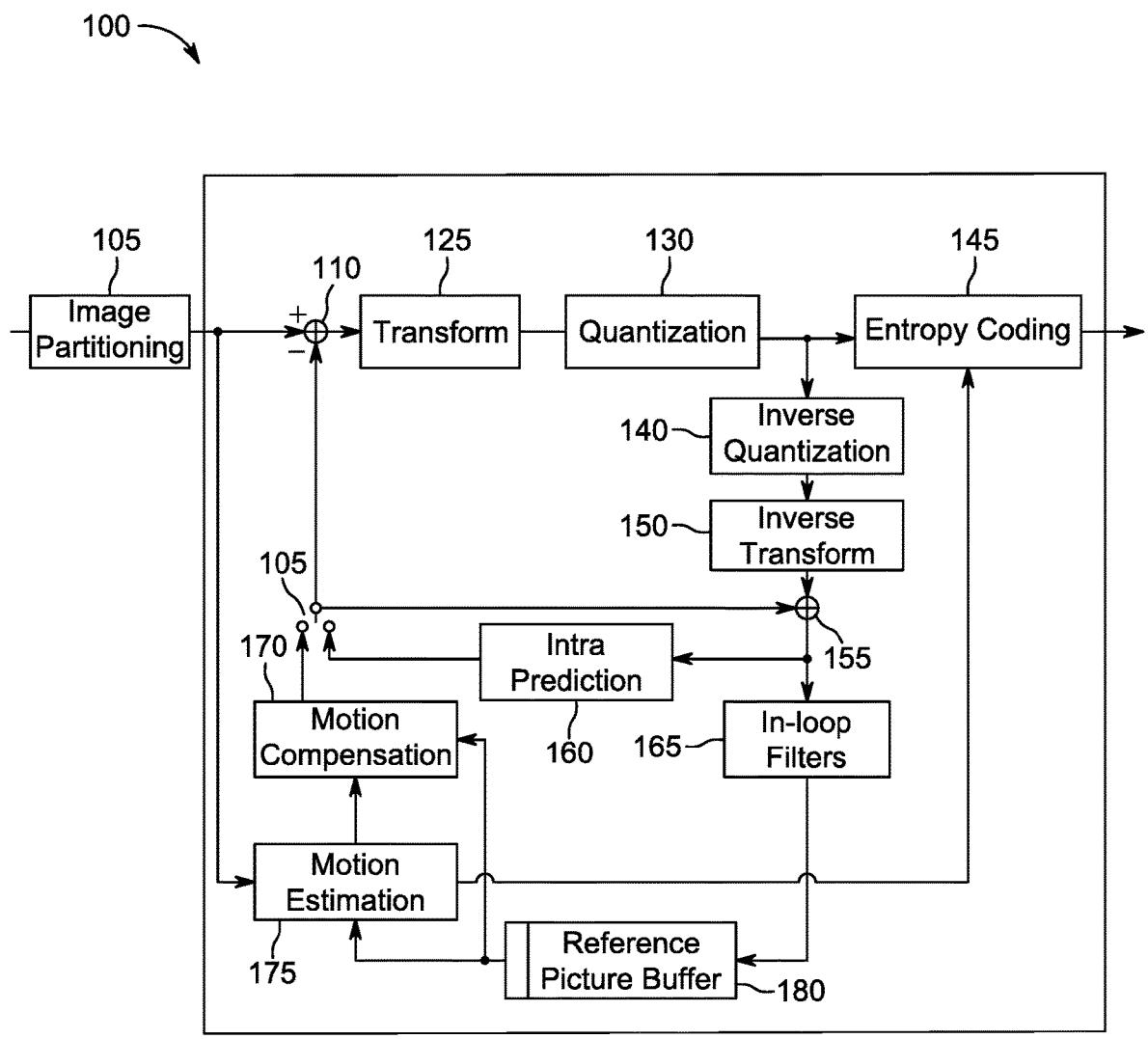
FIG. 6 illustrates a standard, generic video compression scheme.

These methods aim at piloting the encoder decisions, and therefore are applicable to encoders and improving the encoding decisions. It is related to the element 105 of FIG. 6. It enables the partitioning of the Coding Tree Units while avoiding several Rate-Distortion checks for some potential blocks and their corresponding complexity, resulting in the entire process described in FIG. 6.

The description of the present solution is based on an exemplary version of the reference software designed by the joint Video Exploration Team (JVET) to design the next MPEG/ITU standard for video coding, currently known as H.266.

In this framework, the images are divided into non-overlapping Coding Tree Units (CTUs), like in HEVC. CTUs then correspond to the biggest blocks that can be considered for encoding a given region. In the current version, CTUs' are of size 256×256 pixels. Then, when the texture is difficult to predict and encode on the entire CTU's surface, smaller blocks are considered. This allows choosing different prediction/transform/coding tools per blocks adapted to the textures. This is at the price of transmitting more syntax elements to describe those choices and block shapes. Hence, Rate Distortion Optimization is performed to select the best modes and the best partition with respect to a given quality and/or bitrate target. There is a balance that needs to be found between the cost of residuals after prediction and transform and the cost of syntax elements that describe the encoding tools. The bigger the blocks on detailed areas, the more energy of the residuals. On the other hand, the smaller the blocks, the more cost the syntax elements.

In HEVC, the structure of block partitions follows a quadtree. So, for each tree depth, the encoder can decide whether to encode directly the current block or split it into four sub-blocks. This is typically done by evaluating the cost of encoding the block at its current size and comparing it to the sum of the 4 costs of the sub-blocks. If, for a given quality, it costs less bits to transmit the syntax for smaller blocks, the encoder proceeds to the evaluation of the next level of depth in the coding tree. This requires trying out the different prediction modes and transforms and other tools of the standard for all the block sizes until the encoder reaches a block size that minimizes the cost, hence the high complexity of encoders compared to decoders.

In the case of H.266 encoders, the complexity is even bigger for multiple reasons:

Block sizes range up to 256×256,
Different block shapes are considered: square and rectangle blocks,
More prediction tools,
More transforms.

As the described embodiments tackle the improvement in choice of block shapes, the following paragraphs will focus on the first two reasons above.

These embodiments propose to use a Convolutional Neural Network CNN-based method to speed-up the process of deciding to split a block or not based on inputs collected for the block. In the following the terms CU or CTU referring to a coding unit to be split will be used indifferently. The CNN outputs probabilities for having a boundary at a location in the block. Then, those outputs are processed to output decisions such as:

No split: encode the block at its current size and shape

Split (quad/binary/ . . . ): perform the chosen split and continue with the encoding at the next level of depth.

No action: let the encoder perform the cost evaluation and make decisions in the classical way.

The next sections detail the CNN architecture, its inputs/outputs, how it is trained and how it is used by the encoder to process the partition tree decisions.

Figure 7:
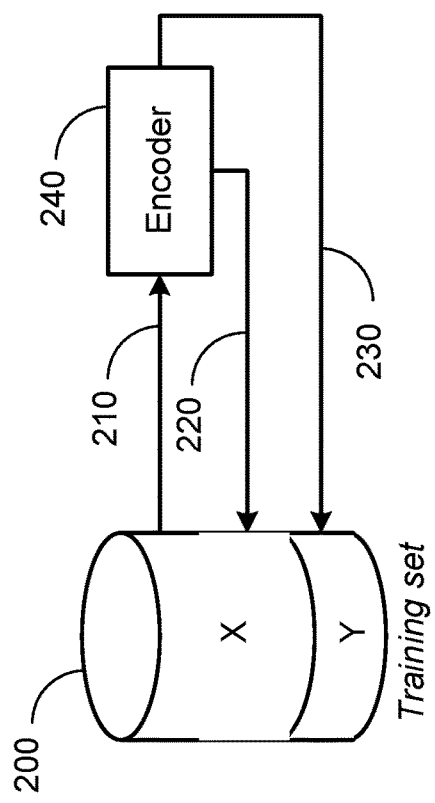
FIG. 7 illustrates an embodiment for building a training dataset for a CNN (Convolutional Neural Network).

FIG. 7 depicts the framework for building a training dataset for a CNN. First, a large dataset of patches 200 (an input block or CU and corresponding information X) is collected to build up the training set. The CUs are gathered within raw sequences. The CUs are classically encoded 240 to derive 230 the ground truth vector Y of boundaries that would be chosen by the actual encoder 220. According to variant embodiments, some additional information X is also derived 220 from the encoding and fed to the CNN.

Figure 8:
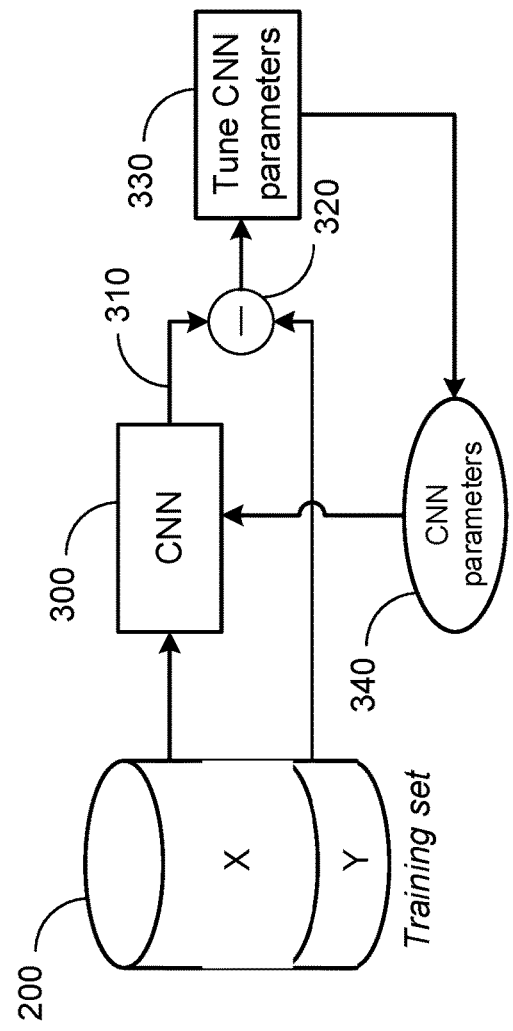
FIG. 8 illustrates an embodiment for training a CNN.

FIG. 8 depicts the framework for training a CNN. The CNN 300 provides a prediction vector of boundaries possibilities 310 using its current parameters. The prediction vector and its operation are described later with reference to FIGS. 14 and 16. The vectors are compared using a loss function 320. For example, the Mean Squared Error is used to evaluate the vectors. This loss is then used to derive/tune new parameters of the CNN through an optimization process 330. Once this CNN is trained on a very large set of images and its parameters are set 340, the CNN can be directly used by the encoder.

The inputs of the CNN according to various and non-limiting embodiments are described hereafter. In a nutshell, in an encoder, in case of inter slice, the splitting of a block mostly depends on the underlying motion and on the prediction coming from the motion compensated block. Accordingly, the inputs of the CNN for inter image partitioning are derived from motion compensation information associated to the block. In the following, the terms "root CU" indicates the size of the input CU to the CNN. It can correspond to the CTU itself, e.g. 256×256, or the root-CU for the CNN can be set at a different depth level in the CU hierarchical partitioning tree, e.g. 128×128 or 64×64. According to this embodiment, a classical RDO or direct split inference can be used for the first depths, the CNN then pilots the splits for the remaining depth levels.

Figure 9:
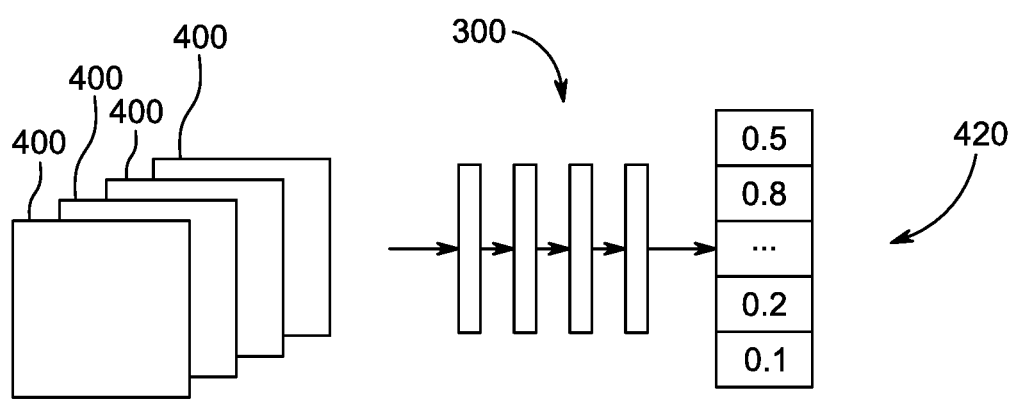
FIG. 9 illustrates a CNN with multi-components input.

FIG. 9 illustrates a CNN with multi-components input. Each component 400 is a channel of size equal to one root CU. Each component 400 is an input of the CNN 300. The output of the CNN is a prediction vector 420 of boundaries possibilities. According to various and non-limiting embodiments, the channels 400 comprise, for each location of the root CU, information relating to:

the horizontal (dy) component of the motion vector with respect to a reference picture, the vertical (dx) component of the motion vector with respect to a reference picture, the residual from the motion compensation based on the motion vector, or in a variant the prediction used in the motion compensation (in the variant of the prediction the original texture component is mandatory), optionally, the original texture, i.e. of the original pixel of the CU.

According to one embodiment, a location of the root CU corresponds to an elementary sub-block of size 4×4 (ex: 16×16). According to another embodiment, a location of the root CU corresponds to a sub-block more than 4×4, for instance 16×16 or 64×64, to speed up the CNN. Besides, the size of location depends on the root-CU size. A motion vector and residual are defined for 4×4 subblocks in a root-CU of size 64×64 while according to another example, a motion vector and residual are defined for 32×32 sub-blocks in a root-CU of size 256×256. Thus, unlike X. Shen et al. in "*Fast coding unit size selection for HEVC based on Bayesian decision rule*" which only takes into account one residual or motion vector magnitude per block, the CNN implementation advantageously allows higher complexity in the model taking into account co-located inputs (for each location) inside the root-CU. In a variant, the number of channels for motion vectors and corresponding residual is equal to the number of possible reference pictures. In other words, the input channels of the CNN comprise a plurality of a motion vector field and residual data with respect to each of a plurality of reference images.

In another variant, the input channels of the CNN comprise one channel per luma and chroma component (Y, U, V) of the residual (or prediction). The residual (or prediction) is composed of the 3 components Y, U and V, where U and V have been upscaled to the same scale as Y if necessary. Alternatively, only the Y component is used as an input to the CNN.

In another variant, the input channels of the CNN comprise one channel per luma and chroma component (Y, U, V) of the original texture. The original texture is composed of the 3 components Y U and V, where U and V have been upscaled to the same scale as Y if necessary. Alternatively, only the Y component is used as an input to the CNN According to a particular embodiment, such component values are normalized as described hereafter.

Thus, the number of inputs channels can be computed as follows:

1 to 3 channels per residual data, 2 channels per motion field,

Optionally 1 to 3 channels for texture, Besides, the number of channels for residual and motion field is multiplied by the number N of considered reference image. Accordingly, the number of channels is between 3, for the variant with 1 reference image and one luma component for the residual, to 5×N+3 for the variant with N reference images, 3 color components for both residual and texture.

Advantageously, using information on motion field as CNN input allows to find discontinuities in motion that will induce the same partitioning choices as the partitioning choices of the encoder. Indeed, the inter-prediction in the encoder is based on motion compensation prediction, thus partitioning prediction in both encoder and CNN are based on coherent information.

Figure 10:
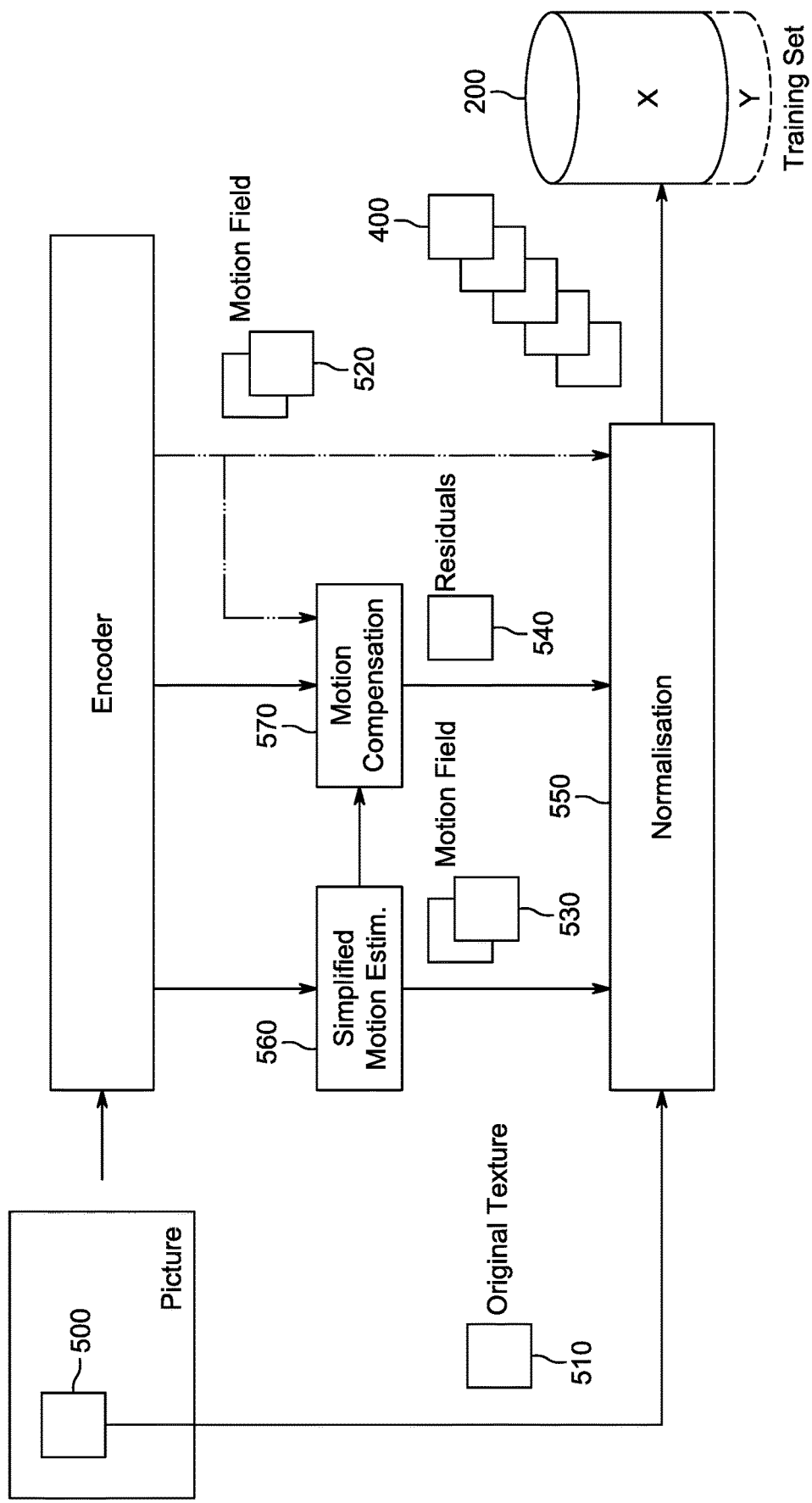
FIG. 10 illustrates an embodiment for obtaining the CNN inputs.

For the sake of completeness, the generation of inputs of the CNN in any its embodiments are now described with respect to FIG. 10. The motion vectors are obtained from motion fields 520 or 530 generated either by simplified motion estimation 560 or by the uni-lateral motion estimation of the encoding loop. The block of residuals 540 (equivalent to block prediction when original block 510 is known) are obtained using the motion compensation responsive to the considered motion field 520 or 530. The original texture 510 is obtained from the root CU 500. After normalization 550, the input channels are fed to the CNN.

The inputs of the CNN according to various and non-limiting embodiments are now described.

Motion Fields

Figure 11:
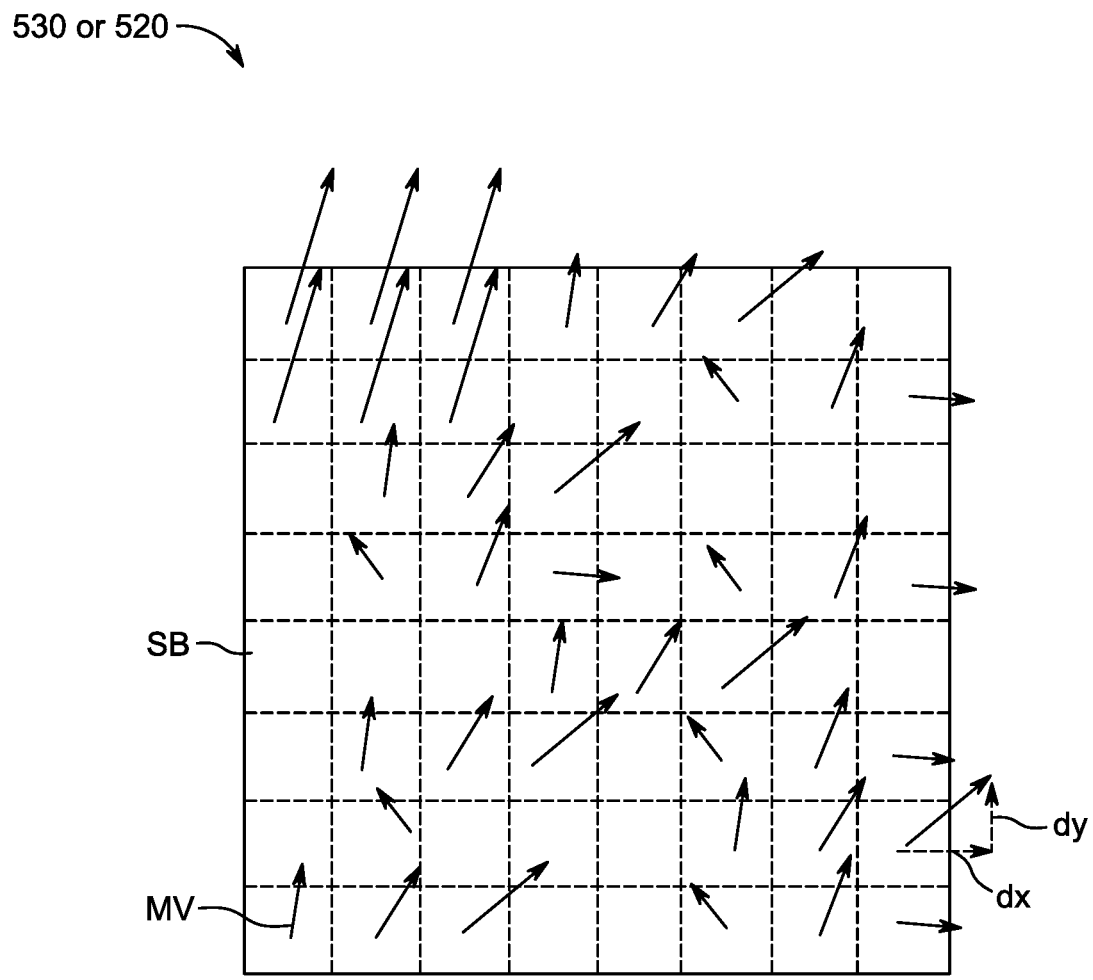
FIG. 11 illustrates a motion field for a coding block.

In a typical encoder, the motion field is obtained per root-CU (for example 256×256) via motion estimation as illustrated on FIG. 11. The root-CU is divided into sub-blocks SB of various size as discussed above (from 4×4 up to 64×64 for instance) depending on the size of predicted elementary boundaries and a motion vector MV is determined for a subblock. In case where no motion vector is defined, the prediction with motion estimation is supposed to be not valid. In this case, the variant of the mask as described below can be used. This process considers the causal nature of the motion vector predictor. Some encoders, such as JEM encoder described by X. Li and K. Suehring in "Report of AHG3 on JEM software development" (in JVET-10003, 9$^{th}$ Meeting: Gwangju, K R, 20-26 Jan. 2018), can use this motion information to derive motion field for current picture using uni-lateral derivation process. Thus, according to an embodiment, the motion field 520 generated by encoder are used to feed the training data set 200. According to another embodiment, the motion field 530 generated from a dedicated motion estimator 530 are used to feed the training data set 200. Such a dedicated motion estimator 560 performs a simplified causal motion estimation 560 based on hierarchical block matching for the current root-CU. The block matching can be performed per sub-block 4×4 or 8×8 depending on the size of predicted elementary boundaries. The block matching algorithm can be initialized with the motion field produced by the encoder from the neighboring CU. This will favor homogeneous motion field that lower the encoding cost, as regular encoder motion estimator driven with RDO would do (i.e. the simplified motion estimator being causal, responsive to block matching and run on a root CU level).

Once a motion field is obtained for the root CU, it is split into 2 channels "dx" and "dy" as shown on FIG. 11 respectively along the horizontal and vertical axis. In one embodiment, each motion component is normalized 550 using the following function:

$$f(x) = \min\left(\max\left(\frac{x-m}{s}, -1\right), 1\right) \quad (1)$$

Where m is the average value of "dx" (resp. "dy") over the current root CU of the component, and "s" is a scaling factor. The scaling factor is typically set to s=32 and values above are clamped to the range [−s;s] in order to bound f(x) to the range [−1;1]. In one embodiment, the factor s can be adapted by frame depending on the temporal depth of the current image, which corresponds to the temporal distance of the current image to the reference image ($POC_{cur}-POC_{ref}$). Thus, a relative weight is set to the CNN inputs responsive to the temporal distance between the current image and the reference image.

In one embodiment, one uses the first reference picture in the Decoded Pictures Buffer (DPB) which is generally the one with higher quality (closer temporal/POC distance and lower QP/temporal depth).

In another embodiment, one can create several N motion fields (one per reference picture) and the N motion fields are used as inputs to the CNN.

In another embodiment, a mask is associated with the motion field to indicate where the motion information is valid in the CU. This mask is also input of the CNN.

Image Prediction or Residuals

From the above motion field 530 and the corresponding reference image for instance stored in the DPB of the encoder, a block prediction is determined using motion compensation 570. Accordingly, the residuals 540 are computed as the difference between the original texture 510 and the block prediction. Advantageously, the motion compensation can be done with simple motion compensation filters or even without filters (full pel motion compensation) to reduce the complexity.

In one embodiment, the residuals are normalized with the function (1) with m=0 and s equal to 2^bitdepth for example, where "bitdepth" is the original input picture bit-depth.

In one embodiment, the input data are prediction data and original texture data. In another embodiment, the input data are residual data.

In another embodiment, since the luma and chroma components of the residual may not have the same spatial precision, the chroma components of the residual are upsampled or the luma components of the residual are downsampled.

In another embodiment, the relative weight of the chroma components of the residual are set lower than the luma component of the residual using an additional factor s' with s' in]0,1]. The following function is then used for chroma component of the residuals:

$$f(x) = \min\left(\max\left(s' * \frac{x}{s}, -1\right), 1\right)$$

Original Texture

According to an optional characteristic, the original texture data 520 is one additional input to the CNN. In one embodiment, the residuals are normalized with the function (1) where m=0 and s=2^bitdepth.

Figure 12:
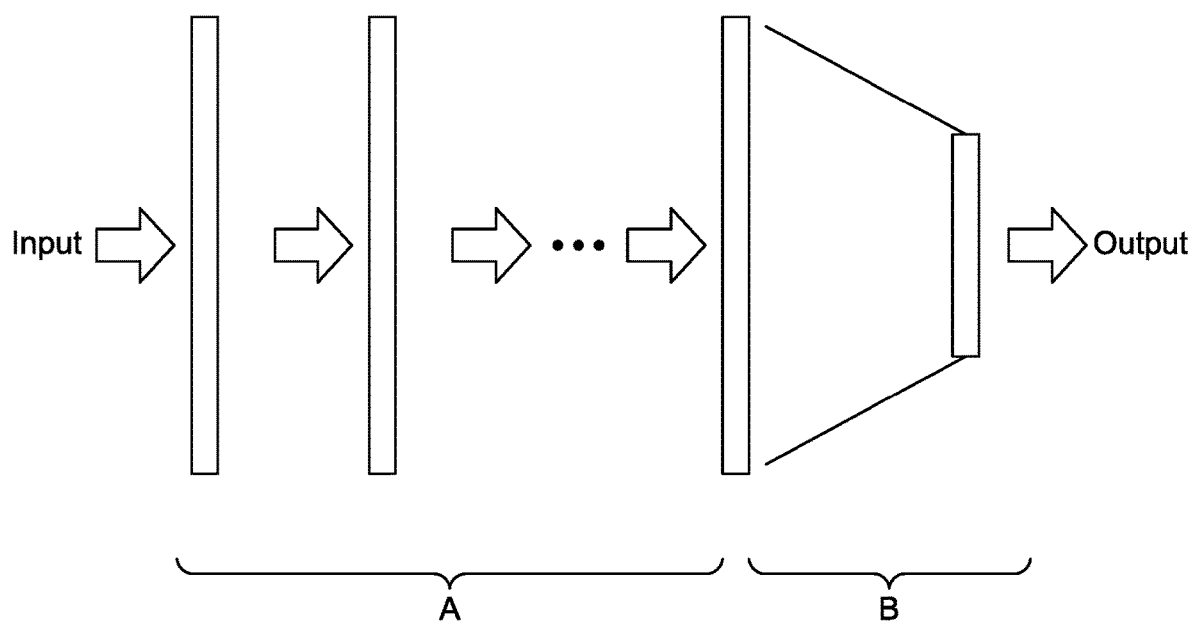
FIG. 12 illustrates a classical CNN scheme.

In FIG. 12, we show a general design for a Convolutional Neural Network (CNN), where the first part A is composed of convolutional layers, and the part B is composed of Fully Connected (FC) layers which reduce the dimension of the output of part A to the dimension of the output. Note that part A can contain other types of layers (MaxPool, Addition etc.) and part B can comprise other dimension reducing layers (MaxPool etc.). MaxPool takes a maximum value from each cluster of neurons at a previous layer.

As the splits results depend a lot on the target QP, one can train a network by QP, or every n QP. Another method is to input the QP as an input channel. In this case, the quantization scale is normalized between 0 and 1 before input. Note that it also allows the setting of a QP by sub-block.

Figure 13:
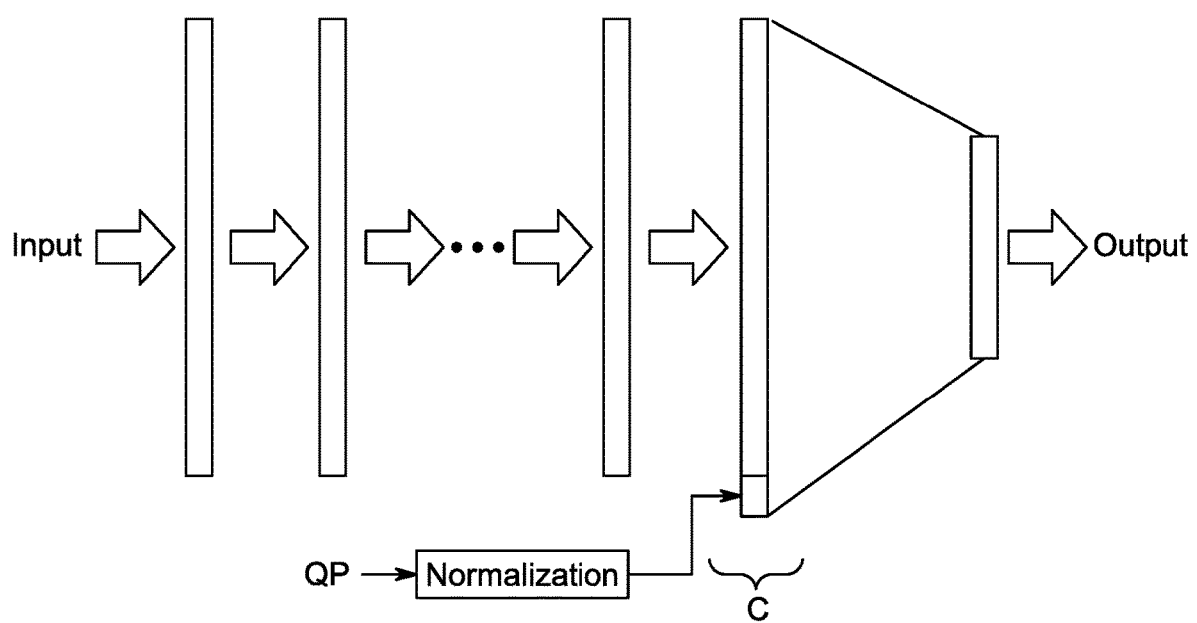
FIG. 13 illustrates another embodiment of a CNN scheme.

In another embodiment, the QP of the block is input after the convolutional part, i.e. in the fully connected part. It is simply a component added to the vector resulting of the convolutional part, after a normalization as illustrated on FIG. 13.

In another embodiment, the input of the CNN takes several component channels, for example to deduce the split tree of the chroma components, both U and V components are input. In another embodiment, when the luma and the chroma share the same tree, all 3 components are input.

Figure 14:
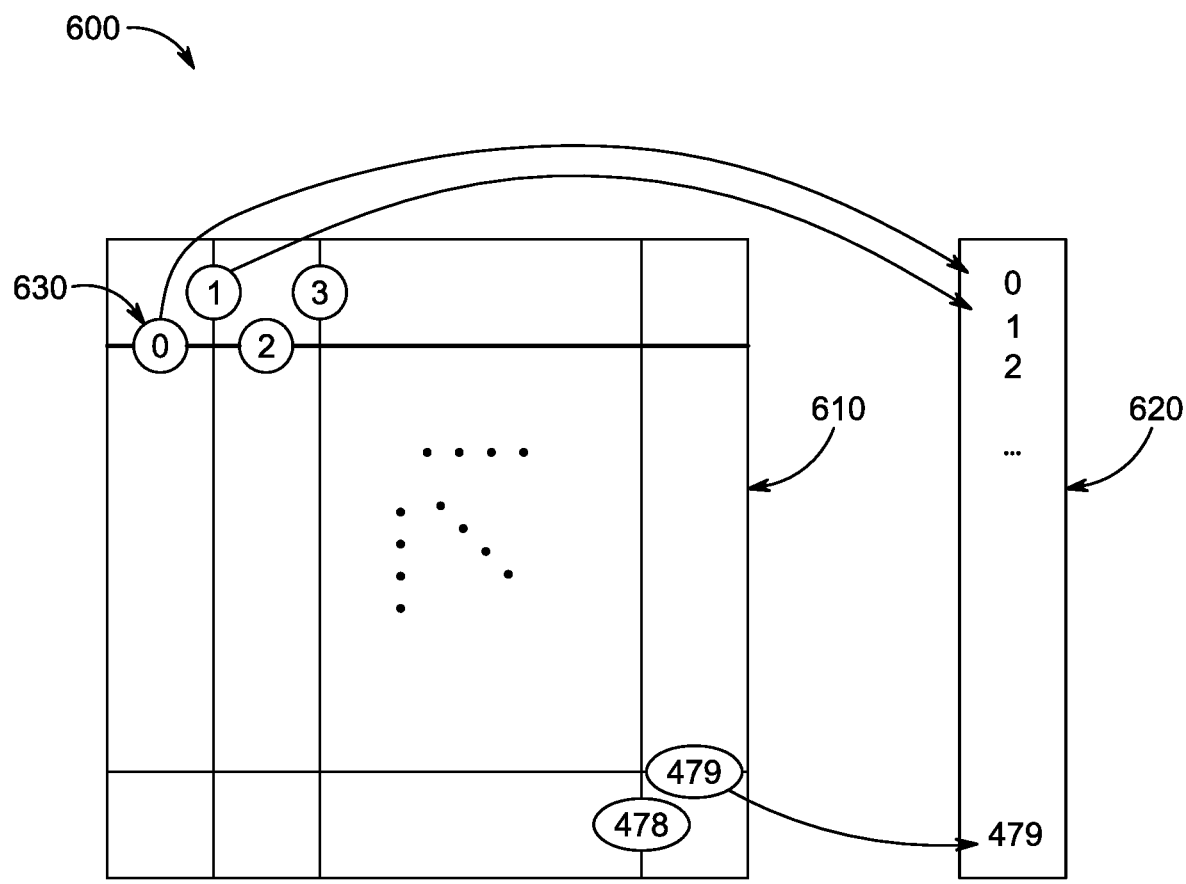
FIG. 14 illustrates an embodiment of resulting vector of boundaries from outputs of a CNN.
Figure 15:
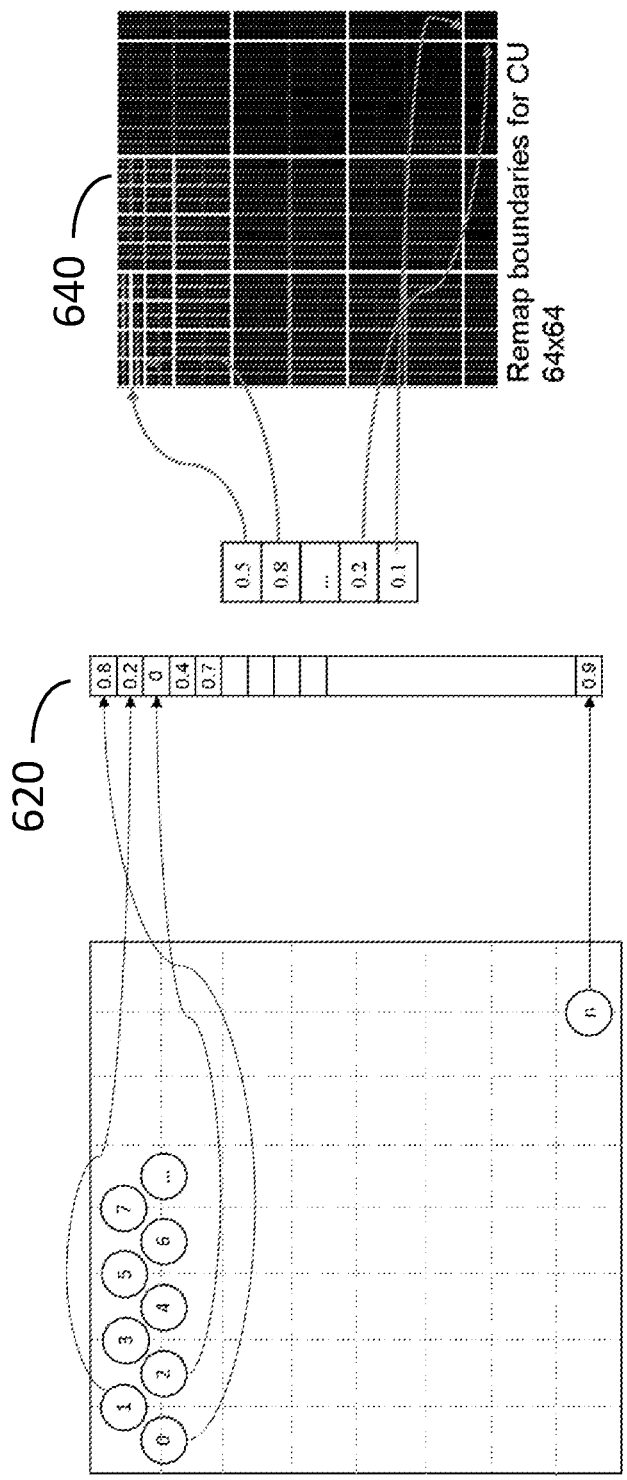
FIG. 15 illustrates another embodiment of resulting vector of boundaries from outputs of a CNN.

The outputs of the CNN according to various and non-limiting embodiments are now described. The output of the CNN corresponds to a vector in which each value represents one possible border within a given CTU. In H.266, the minimal block size being 4×4, only pixel borders on a 4×4 grid can be considered for block splits. Hence, for each potential border, the CNN outputs a probability for it to correspond to an actual border between two blocks. For instance, with a CTU size of 64×64, a vector of size 480×1 is considered. FIG. 14 depicts an exemplary mapping between potential 4 pixel-long borders in a CTU 610 and their corresponding value in the output vector 620. Each boundary, for example, boundary #0 630, is assigned an index which can be in a predefined order. In the example shown, the CTU is of size 64×64, which results in a vector of 480 values. More generally, the size of the vector would be $S=2*N*(N-1)$ where $N=W/w$, where W is the CTU size in pixels (for example, W=64) and w is the sub-block size (for example, w=4). Advantageously, to reduce the size of the CNN, the elementary sub-block size is set to more than 4×4 (ex: 16×16) and the regular encoder RDO will handle the smaller partitions as done traditionally. FIG. 15 depicts another exemplary mapping of the output vector 620 in the form of an image of boundaries 640 with associated probabilities.

Figure 16:
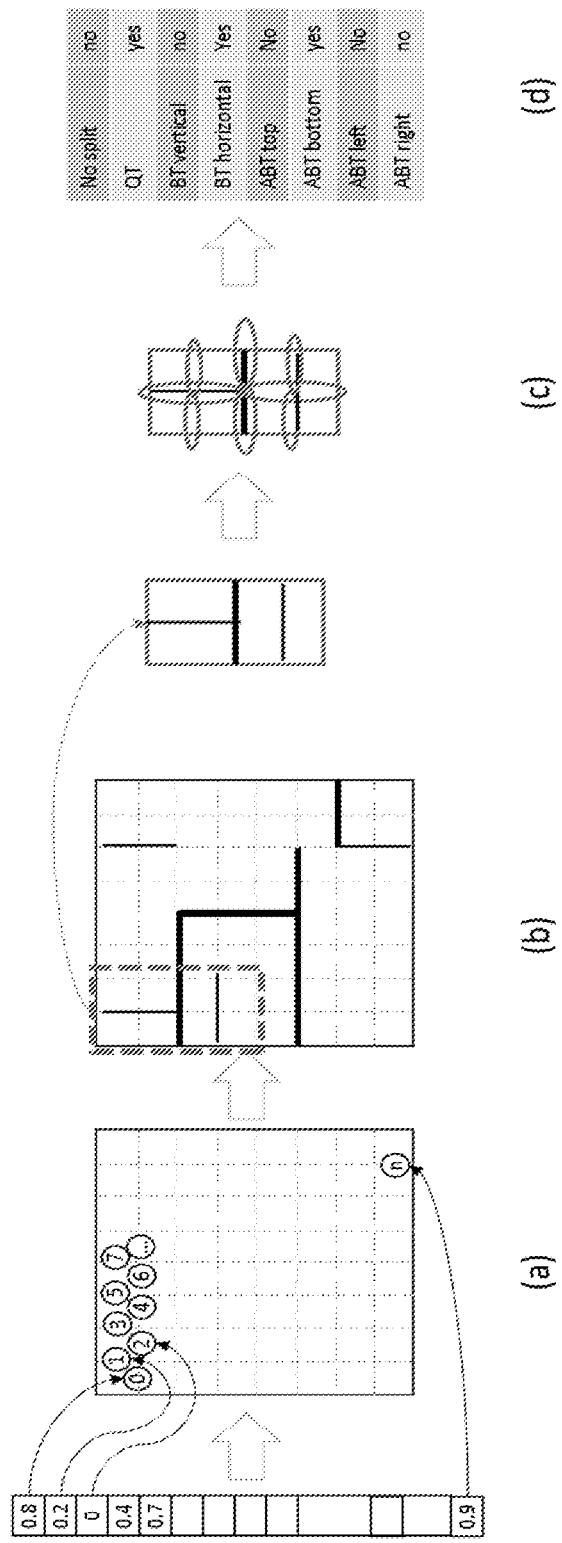
FIG. 16 illustrates derivation of the split decision from a CNN output.

Then, in a final step, from the CNN output prediction vector, the encoder can derive the split decisions as illustrated on FIG. 16. In a nutshell, based on a probability for each potential border to correspond to an actual border between two blocks, the encoder determines the split decisions. The set of split decisions depends on the codec syntax and the supported split types. An example of different split types is given in table (d) of FIG. 16. A technique for deriving the split decisions and associated probabilities from the CNN output has already been disclosed by the same applicant in the European patent Application 18305069.9 filed on Jan. 26, 2018 and in the European patent Application 18305341.2 filed on 27 Mar. 2018.

Intra CUs in Inter Slices

An inter slice may contain CU coded in intra and in inter.

Thus, in another embodiment, a vector of inter-intra coding mode possibilities for a block of image data is further generated by said convolutional neural network. Then, in another embodiment, the convolutional neural network further processes another convolutional neural network for generating a vector of boundaries possibilities for said block of image data from a block of image data comprising pixels and causal adjacent pixels as disclosed in the European patent Application 17306773.7. Indeed, the CNN for predicting split decisions in inter is firstly used with root CUs and allows deriving a set of partitions to be evaluated by the encoder with traditional RDO in inter. Then, the CNN-intra as described in the European patent Application 17306773.7 is used to predict split decisions in intra and derive the set of partitions to be evaluated by the encoder with traditional RDO in intra.

In another embodiment, after the RDO evaluation of one sub-CU in inter, the decision whether to use CNN-intra is made on the following conditions C1 & C2:

1) C1: the energy of the residuals is superior to one threshold thR. The energy of the residuals can be measured with SAD or sum of the absolute value of transformed coefficients for example.
2) C2: the sub-CU size is greater than threshold ThS.

The rationale is that for small CUs, the complexity in term of resources (time and computation load) to infer the CNN-intra may be high compared to the complexity of evaluating all the RDO modes of small partitions.

Figure 17:
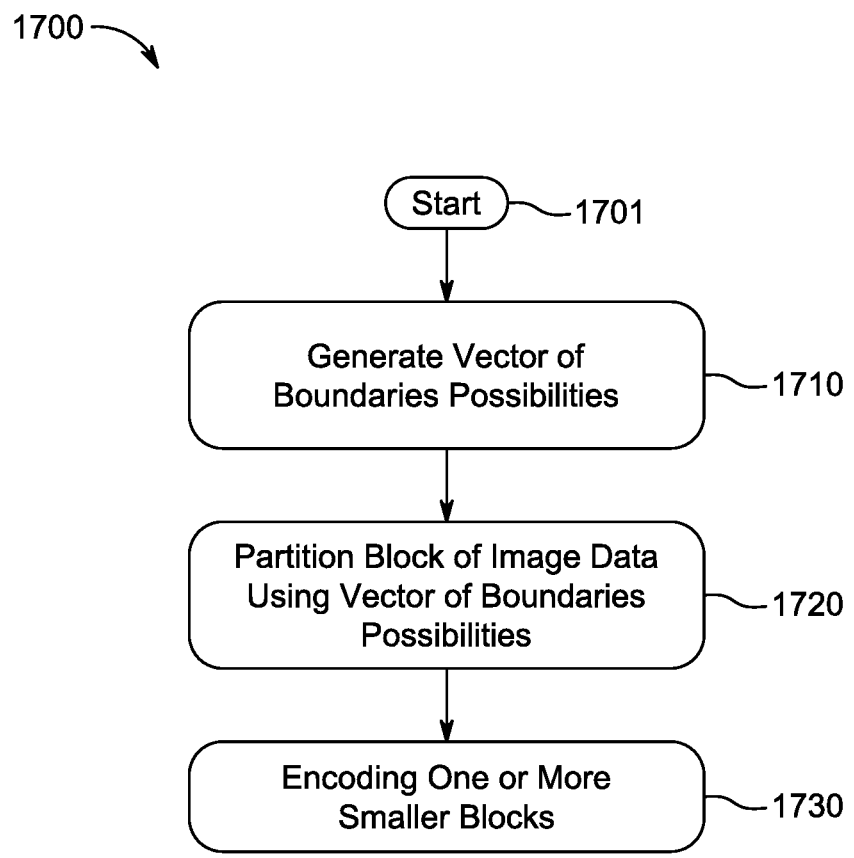
FIG. 17 illustrates one embodiment of a method using the described aspects.

FIG. 17 shows one embodiment of a method 1700 for coding a block of video data. The method commences at Start block 1701 and proceeds to block 1710 for generating a vector of boundaries possibilities for a block of image data using pixels of the image. Control proceeds from block 1710 to block 1720 for partitioning a block using the vector of boundaries possibilities. Control proceeds from block 1720 to block 1730 for encoding one or more of the smaller blocks of the block.

Figure 18:
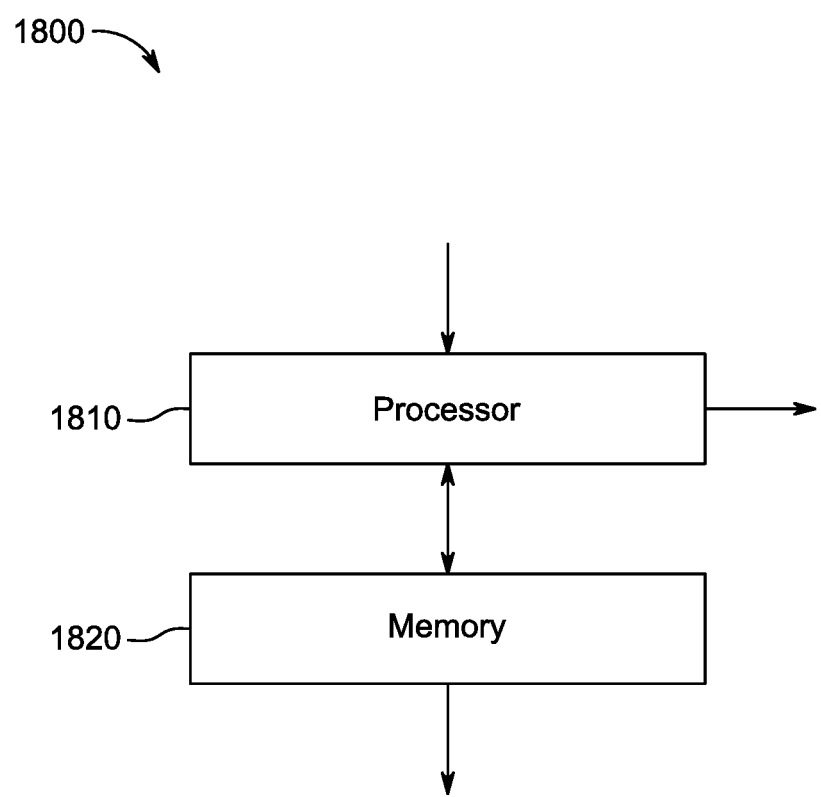
FIG. 18 illustrates one embodiment of an apparatus using the described aspects.

FIG. 18 shows one embodiment of an apparatus 1800 for coding a block of video data. The apparatus comprises Processor 1810 which has input and output ports and is in signal connectivity with Memory 1820, also having input and output ports. The apparatus can execute the aforementioned method embodiment, or any variations thereof.

The functions of the various elements shown in the figures can be provided using dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether such computer or processor is explicitly shown.

In the claims herein, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method, comprising:
generating a vector of probabilities for a block of image data using a convolutional neural network from at least one input data, said block of image data comprising a plurality of sub-blocks, a probability among said vector probabilities corresponding to the probability that a split occurs at a particular border of a sub-block of said block of image data, and an input data comprising, for said block of image data, a motion vector field and residual data from motion compensation based on said motion vector field wherein said motion vector field comprises a motion vector for each sub-block of said block of image data;
partitioning said block of image data into one or more smaller blocks using said vector of probabilities; and,
encoding said block of image data using motion compensation applied to said one or more smaller blocks.

2. An apparatus for coding a block of video data, comprising:
a memory, and
a processor, configured to:
generate a vector of probabilities for a block of image data using a convolutional neural network from at least one input data, said block of image data comprising a plurality of sub-blocks, a probability among said vector of probabilities corresponding to the probability that a split occurs at a particular border of a sub-block of said block of image data, and an input data comprising, for said block of image data, a motion vector field and residual data from motion compensation based on said motion vector field wherein said motion vector field comprises a motion vector for each sub-block of said block of image data;
partition said block of image data into one or more smaller blocks using said vector of probabilities; and,
encode said block of image data using motion compensation applied to said one or more smaller blocks.

3. The method of claim 1, wherein said wherein said input data further comprises image data of said block.

4. The method of claim 1, wherein said input data further comprises a plurality of a motion vector fields and residual data with respect to each of a plurality of reference images and wherein each motion vector field in the plurality of motion vector fields is obtained using a respective reference image of the plurality of references images.

5. The method of claim 1, wherein motion vector field is estimated with respect to a reference image, and wherein said reference image is the first reference picture in a Decoded Pictures Buffer for reconstructing the encoded block.

6. The method of claim 3, wherein said input data comprises prediction data instead of residual data, wherein the residual data is obtained from prediction data and original image data.

7. The method of claim 1, wherein a motion vector of said motion vector field is normalized with the function:

$$f(x) = \min\left(\max\left(\frac{x-m}{s}, -1\right), 1\right)$$

where m is the average value of the x being the horizontal, respectively vertical component of the motion vector over the sub-block, and "s" is a scaling factor.

8. The method of claim 1, wherein said residual is normalized with the function:

$$f(x) = \min\left(\max\left(\frac{x}{s}, -1\right), 1\right)$$

where x is the residual, s is a scaling factor equal to 2bitdepth, and bitdepth is the image data bit-depth.

9. The method of claim 1, wherein the size of the sub-block is 4×4.

10. The method of claim 1, wherein said convolutional neural network is comprised of convolutional layers and fully connected layers.

11. The method of claim 10, wherein an output of convolutional layers is concatenated with information relating to a quantification parameter of the block before the fully connected layers.

12. The method of claim 1, wherein a vector of inter-intra coding mode probabilities for a block of image data is further generated by said convolutional neural network.

13. The method of claim 12 wherein said convolutional neural network further process another convolutional neural network for generating a vector of probabilities for said block of image data from a block of image data comprising pixels and causal adjacent pixels.

14. The apparatus of claim 2, wherein said wherein said input data further comprises image data of said block.

15. The apparatus of claim 2, wherein said input data further comprises a plurality of a motion vector fields and residual data with respect to each of a plurality of reference images and wherein each motion vector field in the plurality of motion vector fields is obtained using a respective reference image of the plurality of references images.

16. The apparatus of claim 2, wherein motion vector field is estimated with respect to a reference image, and wherein said reference image is the first reference picture in a Decoded Pictures Buffer for reconstructing the encoded block.

17. The apparatus of claim 14, wherein said input data comprises prediction data instead of residual data, wherein the residual data is obtained from prediction data and original image data.

18. The apparatus of claim 2, wherein a motion vector of said motion vector field is normalized with the function:

$$f(x) = \min\left(\max\left(\frac{x-m}{s}, -1\right), 1\right)$$

where m is the average value of the x being the horizontal, respectively vertical component of the motion vector over the sub-block, and "s" is a scaling factor.

19. The apparatus of claim 2, wherein said residual is normalized with the function:

$$f(x) = \min\left(\max\left(\frac{x}{s}, -1\right), 1\right)$$

where x is the residual, s is a scaling factor equal to 2bitdepth, and bitdepth is the image data bit-depth.

20. The apparatus of claim 2, wherein the size of the sub-block is 4×4.

21. The apparatus of claim 2, wherein said convolutional neural network is comprised of convolutional layers and fully connected layers.

22. The apparatus of claim 21, wherein an output of convolutional layers is concatenated with information relating to a quantification parameter of the block before the fully connected layers.

23. The apparatus of claim 2, wherein a vector of inter-intra coding mode probabilities for a block of image data is further generated by said convolutional neural network.

24. The apparatus of claim 23 wherein said convolutional neural network further process another convolutional neural network for generating a vector of probabilities for said block of image data from a block of image data comprising pixels and causal adjacent pixels.

25. A non-transitory computer readable storage medium having stored thereon program code instructions for performing an encoding method when the program is executed by a processor, said encoding method comprising:
generating a vector of probabilities for a block of image data using a convolutional neural network from at least one input data, said block of image data comprising a plurality of sub-blocks, a probability among said vector of probabilities corresponding to the probability that a split occurs at a particular border of a sub-block of said block of image data, and an input data comprising, for said block of image data, a motion vector field and residual data from motion compensation based on said motion vector field wherein said motion vector field comprises a motion vector for each sub-block of said block of image data;
partitioning said block of image data into one or more smaller blocks using said vector of probabilities; and,
encoding said block of image data using motion compensation applied to said one or more smaller blocks.

* * * * *